United States Patent [19]
Pacora

[11] Patent Number: 5,678,349
[45] Date of Patent: Oct. 21, 1997

[54] VARIABLE FISHING LURE

[76] Inventor: Howard E. Pacora, P.O. Box 36, Transfer, Pa. 16154-0036

[21] Appl. No.: 505,526

[22] Filed: Jul. 25, 1995

[51] Int. Cl.$^6$ .................... A01K 85/18; A01K 85/01
[52] U.S. Cl. .............. 43/42.09; 43/42.06; 43/42.33; 43/42.35
[58] Field of Search ............. 43/42.09, 42.06, 43/42.32, 42.33, 42.35, 41

[56] References Cited

U.S. PATENT DOCUMENTS

| | | | |
|---|---|---|---|
| 810,017 | 1/1906 | Ackerman | 43/42.09 |
| 1,740,335 | 12/1929 | Cowan | 43/42.09 |
| 1,807,283 | 5/1931 | Dick | 43/42.09 |
| 2,127,639 | 8/1938 | Breuer | 43/42.09 |
| 2,546,772 | 3/1951 | Neff | 43/42.09 |
| 2,573,399 | 10/1951 | Cannon | 43/42.09 |
| 2,694,876 | 11/1954 | Grasser | 43/42.09 |
| 2,769,267 | 11/1956 | Ansley | 43/41 |
| 2,951,308 | 9/1960 | Kent | 43/42.09 |
| 3,091,883 | 6/1963 | Hufford | 43/42.09 |
| 3,762,092 | 10/1973 | Bercz et al. | 43/42.09 |
| 3,913,257 | 10/1975 | Colgan | 43/42.09 |
| 4,098,017 | 7/1978 | Hall | 43/42.06 |
| 4,745,699 | 5/1988 | Gage | 43/42.09 |
| 4,791,751 | 12/1988 | Francklyn | 43/44.6 |
| 4,941,280 | 7/1990 | Rinaldi | 43/42.36 |
| 5,189,826 | 3/1993 | Schlaegel | 43/42.29 |

*Primary Examiner*—Jeanne Elpel

[57] ABSTRACT

An artificial insert-type fishing lure has an elongated and narrow lower body base that is attached to a fishing line at one end and has fish hooks attached thereto. A clear pivoting member is pivotally attached to the upper side of the base at its forward end so that it pivots and swings upward from the lower body base. The pivoting member defines within itself a cavity within which a removable lure insert is placed. The pivoting member can be made in various different sizes and shapes and is itself interchangeable on the base. When the pivoting member is swung upward, a removable insert of varying colors and appearances and of corresponding shape can be placed within the cavity of the pivoting member, and the upper body is then pivoted downward and snap-fit to the lower body base. The removable insert is thus held within the cavity of the pivoting member. A fisherman can change the color, appearance or shape of an artificial fishing lure quickly and easily either by replacing one artificial fishing lure plug with another of a different color or appearance, or by replacing one pivoting member with another of a different shape. The base possesses a channel formed in its upper surface and extending from the forward end, under the insert, and to the rear end for placement therein of a fish scent means so that, when water flows through the channel, a fish scent is left behind the artificial lure.

32 Claims, 1 Drawing Sheet

VARIABLE FISHING LURE

BACKGROUND OF THE INVENTION

This invention relates to artificial fishing lures. More particularly, this invention relates to an artificial fishing lure that can be used with insert-type plugs in order to simulate the appearance of a plurality of different bait fish so that a user may select a particular appearance as desired.

It is well known among fishermen that different game fish show preferences for specific types of prey fish in terms of different colors, patterns, shapes or other appearance characteristics. These preferences may vary depending upon the time of day, season of the year, location of the game fish and even region of the same body of water. For a fisherman who uses actual fish bait, the varying preferences of the game fish would necessitate that the fisherman keep a large variety of fish bait on hand in order to take advantage of the varying conditions. Furthermore, as the fish bait loses freshness, its appearance, color or odor may change, causing a prey fish that would otherwise be attracted to the bait to be less attracted thereto. For a fisherman who utilizes artificial fishing lures, the varying preferences of the game fish would require the fisherman to keep a large variety of artificial lures on hand, with several different colors, patterns, appearances and shapes for the artificial bait or plugs. Thus, the number of lures, real or artificial, that must be purchased can make fishing quite expensive.

In addition, because different fishing lures are needed for different and for rapidly changing fishing conditions and for different prey fish, the fisherman must be prepared to change lures quickly several times until he finds one of a color, pattern, shape or appearance that the desired prey fish is attracted to. Each time the lure is to be changed, the previous lure must be removed from the lure holder, the hook or the line and the replacement lure must be attached. This activity requires effort, speed and precision by the fisherman, and frequent and hurried handling of the lure and hooks could result in injury to the fisherman from the hooks. It is, therefore, desirable for artificial fishing lures to be configured such that there is minimal effort required by the fisherman in order to remove one artificial fishing lure and replace it with another.

Many different types of artificial fishing lures have previously been proposed, in particular with regard to attachment-type, insert-type and body-type artificial fishing lures. For example, U.S. Pat. Nos. 2,546,772 ("Neff") and 2,573,399 ("Cannon") disclose replaceable bodies for artificial lures that are attached to the bases of the respective lures via screw threading. This type of artificial fishing lure attachment, however, would require that the fisherman unscrew a first lure body from the base and then screw a second lure body into the base in order to replace the artificial fishing lure. Although resulting in artificial fishing lures that are well secured to the base, these inventions would require that the fisherman waste much invaluable time and effort in order to replace an artificial fishing lure. Similarly, U.S. Pat. Nos. 2,127,639 ("Breuer"), 2,694,876 ("Grasser"), 3,091,883 ("Hufford") and 4,941,280 ("Rinaldi"), all disclose various artificial fishing lures having different methods of attachment of the of the variable lure body to the base thereof. However, most of these also require a significant amount of manual manipulation and dexterity in order to replace the variable fishing lure body in the base by way of the screws, latches, hooks, vanes, flanges or detent mechanisms shown. This amount of effort and skill is unsuitable for many fishermen, especially those who are elderly or infirm. Moreover, because of the particular construction of many of these inventions, the artificial fishing lures that result from these disclosures are interchangeable only with respect to color but not with respect to shape and appearance of the bait. Thus, the artificial fishing lure will bear little resemblance to the actual prey fish bait of which it is supposed to take the place.

Insert-type lures have also been previously proposed. In particular, U.S. Pat. No. 1,740,335 ("Cowan") discloses a clear plastic body cover with interchangeable colored film inserts that are replaced in order to change the lure color. A first embodiment in Cowan requires the fisherman to pull or unscrew the lure body and then to refold and place the film insert over a skeleton body in order to change the film insert. As previously discussed, this action on behalf of the fisherman is undesirable due to the amount of time and dexterity that would be required by the fisherman. In any case, being made from paper or celluloid, the flat inserts of Cowan are easily lost or misplaced, thus rendering this system inconvenient. Moreover, the inserts may easily be deformed or otherwise physically deteriorated, especially after having been used once or twice in seawater or after having been chewed upon by a prey fish, thereby reducing the effectiveness of these replacement units. Furthermore, as discussed above, this type of replacement system restricts the artificial fishing lure to only one bait shape or appearance with various different colors.

SUMMARY OF THE INVENTION

It is, therefore, an object of this invention to provide an artificial fishing lure in which any number of different colors and forms may be mounted so that if fish do not bite or strike a lure of one color or form, a lure of another color or form may be substituted easily on the same hook assembly.

It is another object of this invention to provide an artificial fishing lure whose color and shape may be readily changed, in which the body portion is interchangeably mounted upon a hook assembly.

It is still another object of this invention to provide an artificial fishing lure whose color and shape may be easily and quickly changed to take advantage of varying fishing conditions.

It is yet another object of this invention to provide an artificial fishing lure having an interchangeable body portion and a hook assembly, in which means is provided for readily securing the interchangeable body portion to the hook assembly.

It is a further object of this invention to provide an artificial fishing lure having an interchangeable body portion and a hook assembly, in which the body portion may be removed and replaced without removing the hook assembly from the line.

It is a still further object of this invention to provide an artificial fishing lure having an interchangeable body portion that may be reused and interchanged without limitation and without deterioration.

In accordance with a preferred embodiment of this invention, an artificial insert-type and body-type fishing lure or plug has an elongated and narrow lower body base or base that is attached to a fishing line at one end and has fish hooks attached and hanging from its bottom surface. A clear upper body pivoting member is pivotally attached to the base at its forward end so that it pivots about its own forward edge and swings upward from the rearward end of the lower body base. The pivoting member defines within itself a cavity within which a removable lure insert is placed. When the pivoting member is swung upward from the lower body base, a removable insert of varying colors and appearances can be placed within the cavity of the pivoting member, and the upper body can then be pivoted downward and snap-fit to the lower body base. The removable insert is thus held within the cavity of the upper body pivoting member, between the upper surface of the lower body base and the inside surface of the pivoting member. The upper body pivoting member can also be made in different shapes to more closely approximate the shape of a bait fish, and each differently-shaped upper member has several inserts of varying appearances that fit within it.

With this device a fisherman can change the color, appearance or shape of an artificial fishing lure quickly and easily. In order to replace one artificial fishing lure plug with another, the fisherman need only swing open the upper body cavity from the lower body base, remove the artificial fishing lure insert that is present within the upper body cavity, replace it with another, and reclose the upper body pivoting member. In order to change the shape of the artificial lure, the upper body pivoting member can be easily and quickly unhinged and replaced with another of a different shape.

A channel is formed lengthwise in the upper surface of the lower body base for placement therein of a commonly-used jelly or fish oil that emits a "fish scent." The channel runs from the front end of the base, under the upper pivoting member and its enclosed insert, and out to the back end of the base so that water flows through the channel and leaves a fish scent trail behind the artificial lure.

BRIEF DESCRIPTION OF THE DRAWINGS

The above and other objects and advantages of the present invention will be apparent upon consideration of the following detailed description taken in conjunction with the accompanying drawings, in which the characters refer to like parts throughout, and in which.

DETAILED DESCRIPTION OF THE INVENTION

Figure 1:
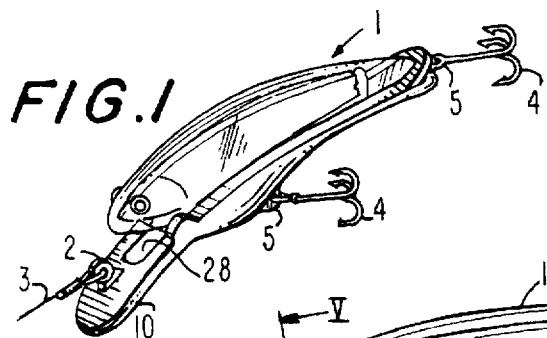
FIG. 1 is a top, front, right-side perspective view of the variable fishing lure of the present invention.
Figure 2:
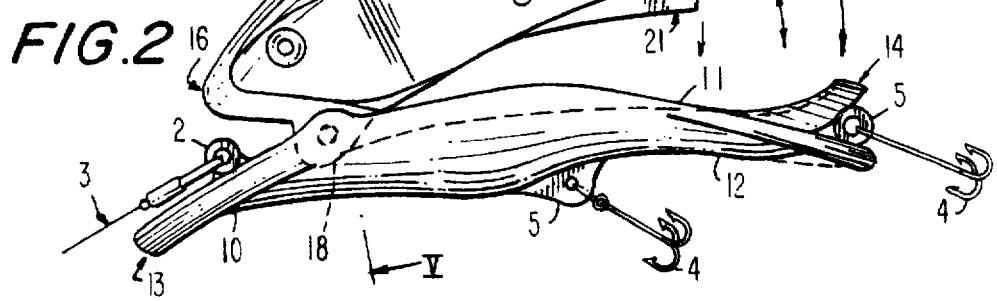
FIG. 2 is a right-side, elevational view thereof with the upper body pivoting member pivoted upward from the lower body base and the removable insert partially inserted.
Figure 3:
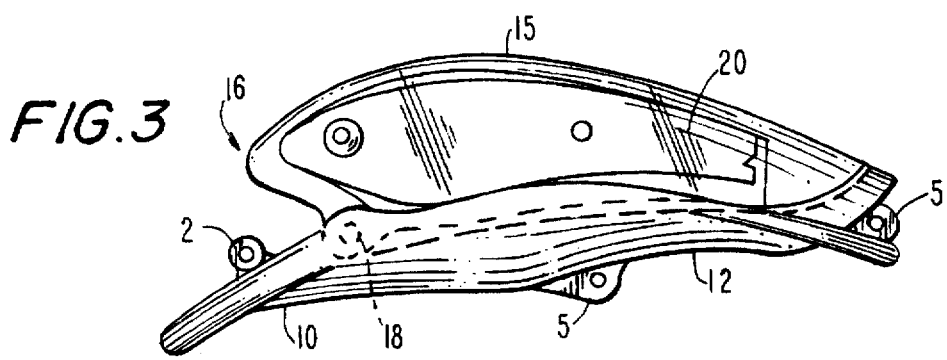
FIG. 3 is a right-side elevational view thereof with upper body pivoting member pivoted downward.
Figure 4:
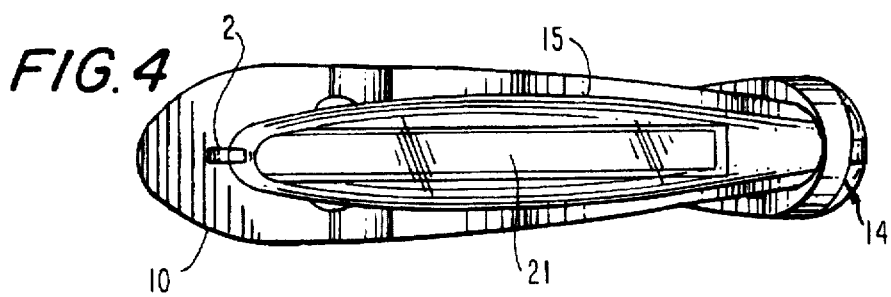
FIG. 4 is a top plan view thereof.
Figure 6:
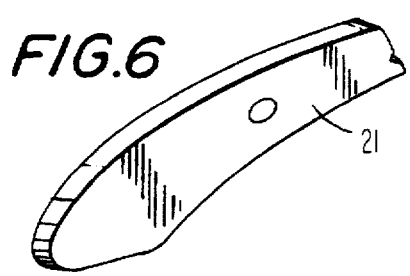
FIG. 6 is a perspective view of a removable insert.

Referring to FIGS. 1 and 2, the variable artificial fishing lure of the present invention, generally designated 1, has an elongated and narrow lower body base 10. A hollow upper body member 15 is pivotally attached to the top surface 11 of the base 10 at a forward region 13 thereof. The hollowed member 15 is elongated such that its rearmost end 17 lies adjacent to the rearmost 14 end of the base 10. The upper member 15 pivots about a hinge 18 (shown in FIG. 3) at its own forward end 16 and its rearward end 17 swings upward from the rearward end 14 of the base 10. The upper member 15 is hollowed and is open in the direction facing the base upper surface 11. A cavity 20 is thus defined within the upper member 15, access to which cavity 20 may be gained between the upper member 15 and the top surface 11 of the base 10 when the upper member 15 is pivoted upward. When the upper member 15 is swung downward so that its bottommost edges abut the upper surface 11 of the base 10, the hollow cavity 20 of the upper member 15 is inaccessible. However, the upper member 15 should preferably be formed of a transparent or otherwise see-through material so that items placed within the cavity 20 of the upper member 15 will be visible from the outside of the variable fishing lure 1.

The base member 10 has several loops 2,5 attached thereto. One loop 2 is attached to the base 10, preferably at its forward region 13 for attachment of a fishing wire 3, and thereby, remote attachment of a fishing rod. This loop 2 can be placed anywhere on the forward region 13 of the base 10 but, for purposes of illustration, is shown in FIGS. 1 and 2 to be on the top surface 11 of the forward region 13 of the base 10. Another loop 5, or preferably more than one loop, is secured to the base 10 for attachment of fish hooks 4 that are to be used for ensnaring the prey fish. These fish hook loops 5 may be placed anywhere on the base 10 of the variable fishing lure 1 but are preferably on the bottom surface 12 or underside thereof, and most preferably, on the rearward region 14 of the base 10 underside 12.

The base 10 may be formed in any size or shape, but it should be sized and shaped so that it flows easily through water and so that it does not obstruct a prey fish's view of the artificial lure upper member 15 attached to the base 10. Thus, the shape and slope of the base, as shown in FIGS. 1–5, may be set so as to create the appropriate drag and flow characteristics for the desired type of motion of the lure 1 through the water. In addition, the base 10 should be formed from a solid, crack-resistant type of plastic, such as polystyrene, or other material to prevent it from being broken or cracked during use.

The pivoting upper member 15 may be made in any desired size and shape but should be preferably be in the size and shape of a natural bait fish, and most preferably in the size and shape of the natural bait fish that is most attractive to the prey fish that the fisherman desires to catch at the time. For example, in the embodiment shown in FIGS. 1–6, the front region 16 of the upper member 15 is larger in circumference than the rear region 17 of the upper member 15, and the surface of the upper member 15 tapers down towards the surface of the base 10 at the rearward portion 17 of the upper member 15, thereby simulating a head and body of a bait fish. Similar to the base 10, the upper member 15 may be shaped so as to create the appropriate drag and flow characteristics for the desired type of motion of the lure 1 through the water.

The pivoting upper member 15 is equipped with a hinge 18 at its front region 16 for allowing the upper member 15 to pivot away from the base 10. Preferably this hinge 18 is formed as part of the upper member 15 and formed so that the pivoting upper member 15 may be easily detached from the base 10. This can be done by forming pins 18 that protrude from the sides of the upper member 15 and that are rotatably received within small wells 25 and held there by the natural tendency of the sides of the upper member 15 to spread outward. The pivoting upper member 15 is removed by pressing inward on its two sides 23,24, thereby detenting the pins 18 inward and allowing them to be slid upwards and out of wells 25. The hinge 18 may be an axle-type hinge that is separable from both the base 10 and the upper member 15. Such an axle hinge could be placed through the base 10 and upper member 15 from the outside and capped on each end to hold it in place. Such an axle hinge could also be placed through the upper member 15 such that each end of the axle hinge would rest within an opposing one of wells 25. In this case, the axle hinge would have an internal spring so that the ends of the hinge have a tendency to spring outward and thereby be retained within wells 25 and, therefore, hold upper member 15 pivotally in place.

The variable fishing lure of this invention also comprises a plurality of removable inserts 21 that may be interchangeably placed within the hollow cavity 20 of the upper member 15. These removable inserts 21 should be of varying colors and appearances and should have thereon designs or markings such that they resemble many different bait fish and other sea creatures that a prey fish would be attracted to. Each insert 21 may be made of any suitable material, such as plastic, foam or wood with a laminate coating, and may be made in any desired size, shape and contour such that it fits within the cavity 20 of the pivoting upper member 15. Preferably, each insert 21 should conform to the contour of the upper member 15 and be roughly of the same size and shape of a natural bait fish. The insert 21 will thus fit snugly within the cavity 20 of the upper member 15.

In addition to the pivoting upper member 15 that is formed in the shape of the bait fish most attractive to the prey fish, a preferred embodiment of the artificial fishing lure of the present invention further contemplates several additional, interchangeable pivoting upper members that are made in the sizes and shapes of various other natural bait fish. Preferably, these interchangeable pivoting upper members are detachable from the base so that a fisherman may easily switch one pivoting upper member for another. In addition, for each of the various shapes and sizes of the pivoting upper members there is at least one and preferably a plurality of correspondingly shaped and sized removable inserts of varying colors and appearances and having designs or markings thereon such that they resemble the many different bait fish. Each removable insert within the plurality that corresponds to a particular shape and size pivoting upper member should conform to the size, shape and contour of that pivoting upper member such that the removable insert fits snugly within the cavity of that upper member. Thus, a fisherman has the option of varying the size and shape of the fishing lure by changing the pivoting upper member and also has the option of changing the color and appearance of the fishing lure by changing the removable insert. These could all easily be carried by a fisherman using a tackle box wherein each interchangeable upper member and the correspondingly-shaped inserts are placed in a corresponding row, so that a fisherman can quickly find the upper member or insert desired at that moment.

Figure 5:
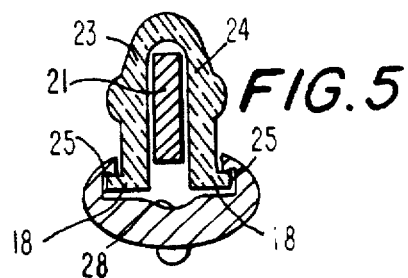
FIG. 5 is a cross-sectional view taken along line V—V of FIG. 2.

In a further preferred embodiment of this invention, as shown in FIGS. 1 and 5, a channel 28 is formed lengthwise in the upper surface 11 of the base 10. Channel 28 extends from the front region 13 of base 10, under the upper pivoting member 15 and the insert 21 enclosed therein, and to the back end 14 of base 10. A jelly-like substance that gives off a fish scent, preferably Power Bait, Baitmate Paste, Smelly Jelly of any of the other commercially-available "fish oil" substances, is placed within the channel 28 when the pivoting member 15 is in a raised position. When the lure 1 is moved through the water, water flows through channel 28. Some of the fish jelly in channel 28 will be carried by the water to the region behind the lure 1 so that the lure 1 leaves a fish scent trail as it flows through the water. Believing the artificial lure to be an actual bait fish, prey fish will be attracted towards the artificial lure because of this scent.

In operation, the artificial fishing lure 1 of the present invention is attached to a fishing rod via a fishing wire 3 that is secured to a loop 2 at the front 17 of the lure. When the fisherman desires to attract a particular type of prey fish using the artificial lure 1, he first opens the body of the fishing lure 1 by lifting the back end 17 of the transparent upper member 15 from the back end 14 of the base 10 by pivoting the upper member 15 about the hinge 18 at its front end 16, thereby exposing the inner cavity 20 of the upper member 15. If there is a bait insert 21 already present within the inner cavity 20 of the upper member, the fisherman removes it and replaces it with another. If the upper member inner cavity 20 is empty, the fisherman places within it the insert 21 that will best attract the desired prey fish. The body of the fishing lure 1 is then closed by pivoting the back end 17 of the upper member 15 downward and snap-fitting it to the base 10. This procedure of inserting, removing or replacing an insert 21 within the artificial fishing lure body 1 is quick and convenient. Moreover, it does not require intricate or dexterous finger manipulations and it is not likely to result in the fisherman or whoever is doing the actions injuring himself by the fishhooks that are attached to the lure body. This invention is, therefore, a quick, convenient and painless way to vary the artificial lure.

If the fisherman desires to attract the same or a different prey fish using the artificial lure 1, he may vary not only the color and appearance of the lure 1 by changing the bait insert, as described above, but also the size and shape of the lure 1 by changing the upper member 15 (and the insert 21 within) for another. This is done by detaching the pivoting upper member 15 from the base 10 and replacing it with another upper member of a different size and shape. As discussed above, the upper member 15 is removed, in the preferred embodiment, by inwardly detenting the two sides 23,24 of the upper member 15 and by sliding the pins 18 out of the wells 25 of the base 10. The new upper member is hingedly attached to the base 10 by sliding its pins 18 within the wells 25 and allowing the sides 23,24 of the upper member to naturally spread or detent outward, thereby retaining pins 28 rotatably within wells 25. Or, if the artificial lure 1 uses an axle-type hinge, the hinge can be removed prior to interchanging upper members, either by uncapping the end of the axle hinge or by axially compressing the ends of the hinge that rest within wells 25, as discussed above. The corresponding bait inserts are then interchanged as discussed above. Thus, the fisherman can keep up with quickly-varying fishing conditions or prey fish preferences by changing the size and shape of the lure 1 in addition to its color and appearance.

Because the upper member 15 is transparent, the insert 21 that is situated within the inner cavity 20 of the upper member 15 is visible from outside. In addition, the fish jelly in channel 28 leaves a fish scent trail behind lure 1 in the water. Therefore, a bait fish swimming nearby will see the attractive bait fish-shaped plug on the artificial fishing lure 1, will smell the fish scent and, believing it to be an actual bait fish, will attempt to swallow it and will be ensnared by the hooks 4 attached to the underside 12 of the base 10.

One major advantage of this artificial fishing lure structure is that, in addition to being interchangeable, the inserts 21 do not deteriorate or deform through use. Because the inserts are completely covered by the transparent upper member 15 and the base 10, the inserts are prevented from damage caused by contact with the teeth of the prey fish or other hard surfaces underwater such as rocks, a reef or the sides of the fishing boat. In addition, because the closure between the upper member 15 of the fishing lure body 1 and the base 10 can be made to be a watertight seal, the insert 21 contained within can be sealed from contact with seawater and can, therefore, be shielded from its corrosive effects.

Thus, a variable fishing lure is provided. One skilled in the art will appreciate that the present invention can be practiced by other than the described embodiments, which are provided for purposes of illustration and not limitation, and that the present invention is limited only by the claims that follow.

I claim:

1. A variable artificial fishing lure comprising:

a base member having a front end and a back end, a means for attachment to the end of a fishing line on said front end, and at least one hook means attached to the back end for capturing fish;

at least one interchangeable body fish bait insert; and a transparent pivot member having a cavity formed therein shaped to receive one of said interchangeable fish bait inserts, said pivot member being hingedly attached to said base member generally at said front end of the base member and extends substantially to said end of the base member, such that pivoting said pivot member away from said base member exposes said cavity for receipt therein or for removal therefrom of one of said interchangeable fish bait inserts, and such that pivoting said pivot member toward and against said base member closes off said cavity and holds one of said interchangeable fish bait inserts therein and visible through said pivot member;

wherein said interchangeable fish bait inserts can be placed into or removed from said pivot member cavity for selectively changing the appearance of said artificial fishing lure.

2. The variable artificial fishing lure of claim 1 wherein each of said at least one interchangeable fish bait inserts has the color and appearance of a different fish bait.

3. The variable artificial fishing lure of claim 2 wherein each of said at least one interchangeable fish bait inserts is shaped to fit within said pivot member cavity.

4. The variable artificial fishing lure of claim 3 wherein said pivot member or said base member further comprise closure means adjacent said back end of said base member for holding said pivot member against said base member and for thereby closing off said cavity.

5. The variable artificial fishing lure of claim 4 wherein said closure means comprises a latch mechanism.

6. The variable artificial fishing lure of claim 4 wherein said closure means comprises at least one detent tab on either said pivot member or said base member and at least one detent tab receiving opening on the other of said pivot member or said base member.

7. The variable artificial fishing lure of claim 4 wherein said closure means comprises a frictional engagement between the edges of said pivot member and a surface of said base member.

8. The variable artificial fishing lure of claim 4 wherein said closure means effects a watertight seal between edges of said pivot member cavity and said base member to prevent water from entering said cavity when said pivot member is held against said base member.

9. The variable artificial fishing lure of claim 4 wherein said base member has a generally elongated planar shape with a top surface and a bottom surface; and said pivot member is hingedly attached to said top surface of said base member.

10. The variable artificial fishing lure of claim 9 wherein said base member has a channel formed therein extending from said front end to said back end, such that a fish scent means can be placed therein, whereby water may flow through said channel and carry some of said fish scent means into said water.

11. The variable artificial fishing lure of claim 4 wherein said at least one hook means for capturing fish is attached to said bottom surface of said base member.

12. The variable artificial fishing lure of claim 4 wherein attachment means of said base member to said fishing line is effected at said front end of said base member.

13. The variable artificial fishing lure of claim 1 wherein said pivot member comprises a first interchangeable pivot member of a plurality of interchangeable pivot members, wherein each of said plurality of interchangeable pivot members has the size and shape of a different fish bait and has two generally-opposing sides.

14. The variable artificial fishing lure of claim 13 wherein said hingedly attached first of said plurality of interchangeable pivot members may be detached from said base member for hinged attachment of a second of said plurality of interchangeable pivot members to said base member.

15. The variable artificial fishing lure of claim 14 wherein said hingedly attached first of said plurality of interchangeable pivot members is detached by detenting inward the sides of said first interchangeable pivot member and separating said first interchangeable pivot member from said base.

16. The variable artificial fishing lure of claim 14 wherein said second of said plurality of interchangeable pivot members is hingedly attached to said base by detenting inward the sides of said second interchangeable pivot member.

17. The variable artificial fishing lure of claim 13 wherein each of said at least one interchangeable fish bait inserts has the color and appearance of a different fish bait.

18. The variable artificial fishing lure of claim 13 wherein said at least one interchangeable fish bait insert comprises one of a plurality of interchangeable fish bait inserts, wherein for each of said plurality of interchangeable pivot members there is at least one interchangeable fish bait insert from said plurality of interchangeable fish bait inserts that is shaped to fit within said interchangeable pivot member.

19. The variable artificial fishing lure of claim 18 wherein each of said plurality of interchangeable fish bait inserts has the color and appearance of a different fish bait.

20. A variable artificial fishing lure comprising:

a base member having a generally elongated planar shape with a top surface, a back surface, a front end and a back end, and having a channel formed in said top surface extending from said front end to said back end, said base member being adapted for attachment to the end of a fishing line and having at least one hook means attached thereto for capturing fish;

at least one interchangeable fish bait insert; and a transparent pivot member having a cavity formed therein shaped to receive one of said interchangeable fish bait inserts, said pivot member being hingedly attached to said top surface of said base member such that pivoting said pivot member away from said base member exposes said cavity for receipt therein or for removal therefrom of one of said interchangeable fish bait inserts, and such that pivoting said pivot member toward and against said base member closes off said cavity and holds one of said interchangeable fish bait inserts therein and visible through said pivot member;

wherein said interchangeable fish bait inserts can be placed into or removed from said pivot member cavity for selectively changing the appearance of said artificial fishing lure; and wherein a fish scent means can be placed in said channel, whereby water may flow through said channel and carry some of said fish scent means into said water.

21. The variable artificial fishing lure of claim 20 wherein each of said at least one interchangeable fish bait inserts has the color and appearance of a different fish bait.

22. The variable artificial fishing lure of claim 21 wherein each of said at least one interchangeable fish bait inserts is shaped to fit within said pivot member cavity.

23. The variable artificial fishing lure of claim 22 wherein said pivot member is hingedly attached to said base member generally at said front end of said base member and extends substantially to said back end of said base member such that, after receipt of said interchangeable fish bait insert within said cavity of said pivot member, said artificial fishing lure has the appearance of a fish bait.

24. The variable artificial fishing lure of claim 23 wherein said pivot member and said base member further comprise closure means adjacent said back end of said base member for holding said pivot member against said base member and for thereby closing off said cavity.

25. A variable artificial fishing lure comprising:

a base member adapted for attachment to the end of a fishing line and having at least one hook means attached thereto for capturing fish;

at least one interchangeable fish bait insert; and at least one interchangeable transparent pivot member having a cavity formed therein and shaped to receive one of said interchangeable fish bait inserts, each said pivot member having the size and shape of a different fish bait, having two generally-opposing sides and being hingedly attached to said base member, such that pivoting said pivot member away from said base member exposes said cavity for receipt therein or for removal therefrom of one of said interchangeable fish bait inserts and such that pivoting said pivot member toward and against said base member closes off said cavity and holds one of said interchangeable fish bait inserts therein and visible through said pivot member;

wherein said interchangeable fish bait inserts can be placed into or removed from said pivot member cavity for selectively changing the appearance of said artificial fishing lure.

26. The variable artificial fishing lure of claim 25 wherein:

said base member has a front end and a back end; and said at least one interchangeable pivot member comprises a plurality of interchangeable pivot members, a first of said plurality of interchangeable pivot members is hingedly attached to said base member generally at said front end of said base member and extends substantially to said back end of said base member;

such that, after receipt of said interchangeable fish bait insert within said cavity of said pivot member, said artificial fishing lure has the appearance of a fish bait.

27. The variable artificial fishing lure of claim 26 wherein said hingedly attached first of said plurality of interchangeable pivot members may be detached from said base member for hinged attachment of a second of said plurality of interchangeable pivot members to said base member.

28. The variable artificial fishing lure of claim 27 wherein said hingedly attached first of said plurality of interchangeable pivot members is detached by detenting inward the sides of said first interchangeable pivot member and separating said first interchangeable pivot member from said base.

29. The variable artificial fishing lure of claim 27 wherein said second of said plurality of interchangeable pivot members is hingedly attached to said base by detenting inward the sides of said second of said plurality of interchangeable pivot members.

30. The variable artificial fishing lure of claim 25 wherein each of said at least one interchangeable fish bait inserts has the color and appearance of a different fish bait.

31. The variable artificial fishing lure of claim 25 wherein said at least one interchangeable fish bait insert comprises one of a plurality of interchangeable fish bait inserts, wherein for each of said plurality of interchangeable pivot members there is at least one interchangeable fish bait insert from said plurality of interchangeable fish bait inserts that is shaped to fit within said interchangeable pivot member.

32. The variable artificial fishing lure of claim 31 wherein each of said plurality of interchangeable fish bait inserts has the color and appearance of a different fish bait.

* * * * *